US010065469B1

(12) United States Patent
Pilcher, III

(10) Patent No.: US 10,065,469 B1
(45) Date of Patent: Sep. 4, 2018

(54) BOX WHEEL VEHICLE AND METHOD FOR MULTI-MEDIUM TRANSPORT

(71) Applicant: Joseph Mitchell Pilcher, III, Wichita, KS (US)

(72) Inventor: Joseph Mitchell Pilcher, III, Wichita, KS (US)

( * ) Notice: Subject to any disclaimer, the term of this patent is extended or adjusted under 35 U.S.C. 154(b) by 0 days.

(21) Appl. No.: 15/331,730

(22) Filed: Oct. 21, 2016

Related U.S. Application Data

(60) Provisional application No. 62/244,714, filed on Oct. 21, 2015.

(51) Int. Cl.
*B60F 3/00* (2006.01)
*B63H 1/04* (2006.01)
*B60F 5/00* (2006.01)

(52) U.S. Cl.
CPC ............. *B60F 3/0038* (2013.01); *B63H 1/04* (2013.01); *B60F 5/003* (2013.01)

(58) Field of Classification Search
CPC ... B63H 1/00; B63H 1/04; B63H 5/00; B63H 5/02; B63H 16/12; B60F 3/00
USPC .......................................... 440/12.66, 27, 90
See application file for complete search history.

(56) References Cited

U.S. PATENT DOCUMENTS 6,247,981 B1 * 6/2001 Farley ...................... B63H 1/04
440/90

* cited by examiner

*Primary Examiner* — Lars A Olson

(57) ABSTRACT

The invention relates to amphibious and "ground affect" vehicles. The invention incorporates a special wheel consisting of a box portion affixed to a disc or wheel portion. A vehicle with such wheels can roll on most surfaces with easy transition from one medium to another. For example, it can roll from the terrain, onto the water and then back to the land. Such wheels enable vehicles to roll on top of the snow and other surfaces where conventional wheels cannot.

1 Claim, 11 Drawing Sheets

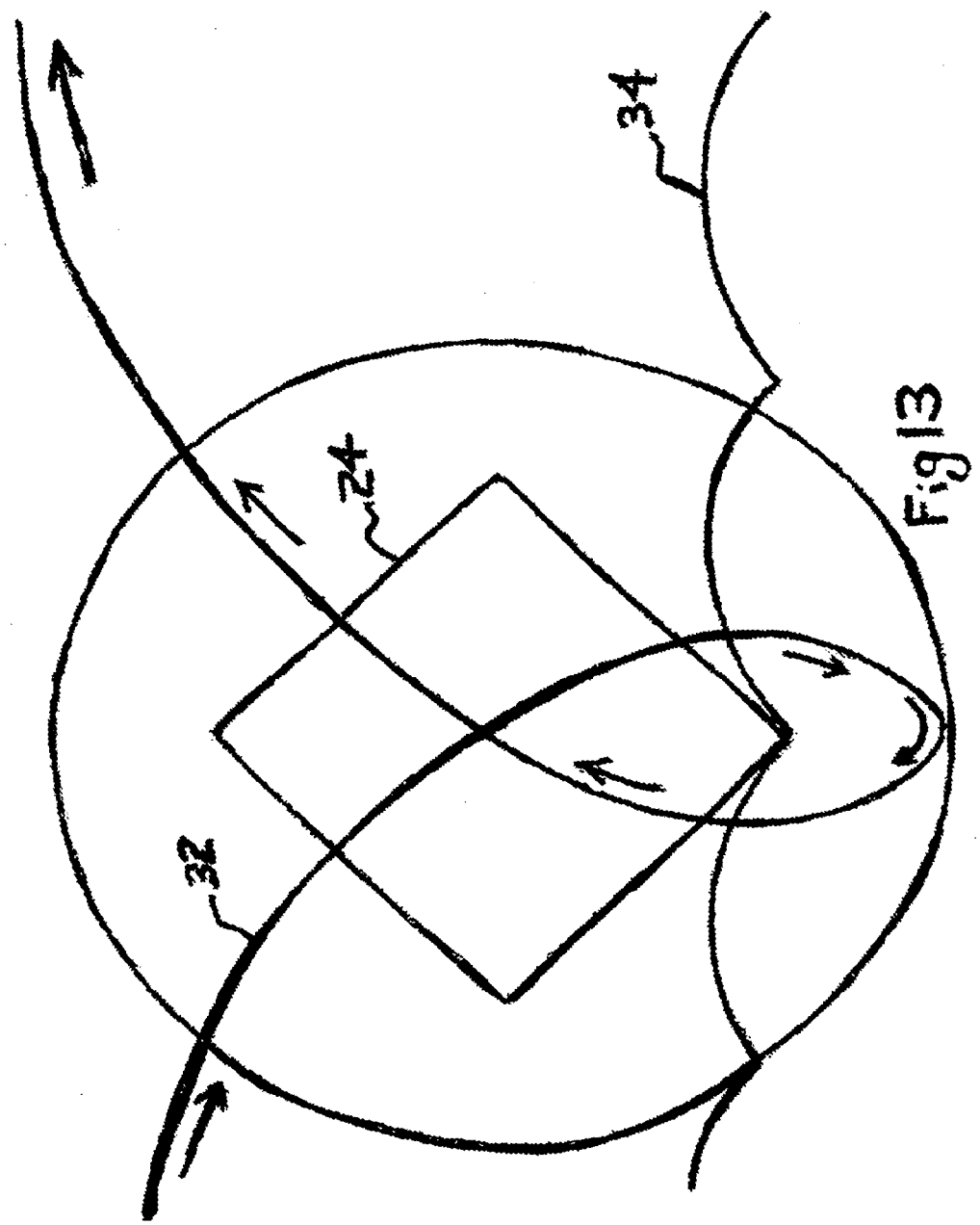

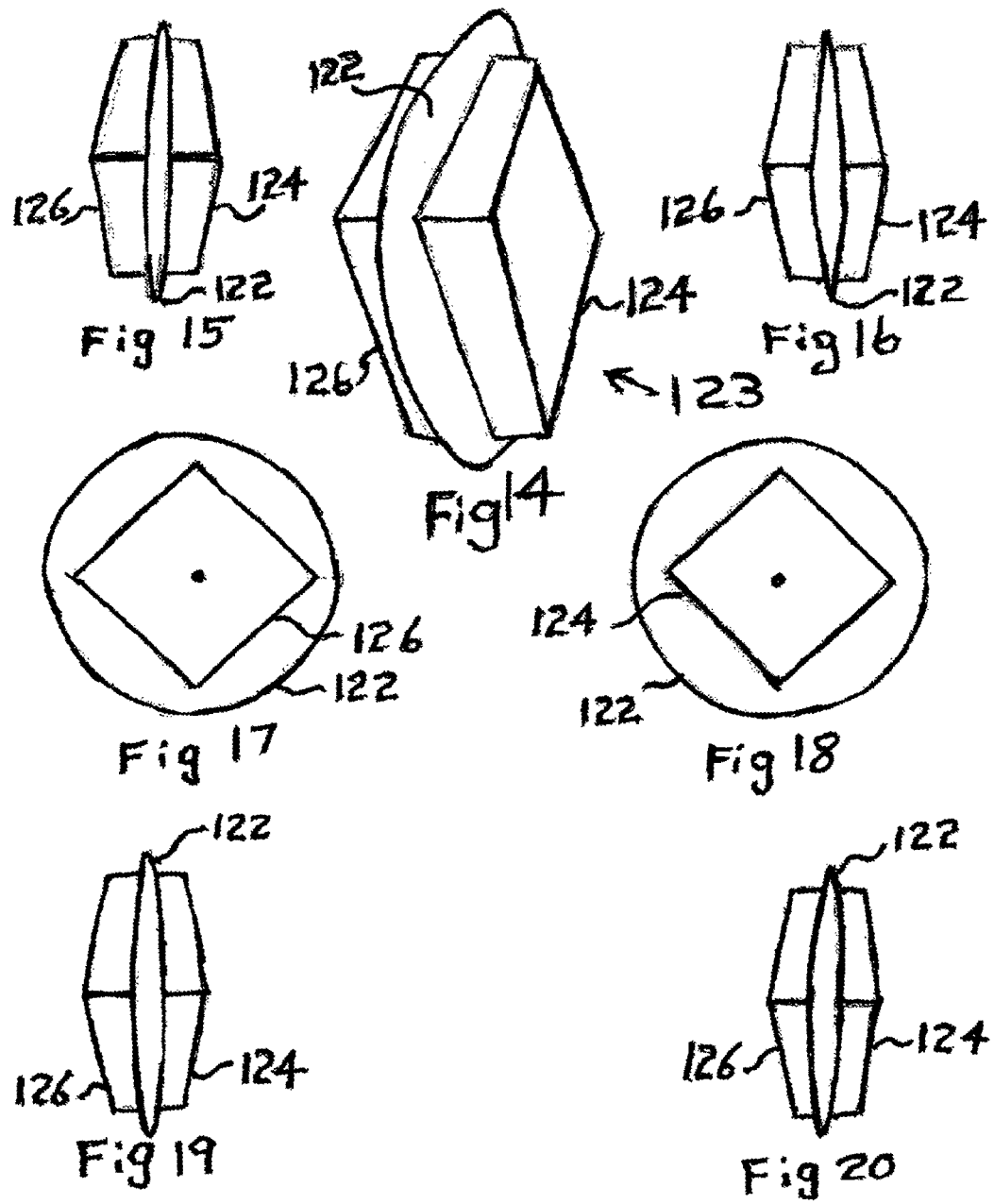

BOX WHEEL VEHICLE AND METHOD FOR MULTI-MEDIUM TRANSPORT

FIELD OF THE INVENTION

This invention relates to a method and device for traversing most surfaces, liquid or solid.

BACKGROUND OF THE INVENTION

Historically, transports have plowed slowly through the water to reach destination. Once at port, cargo would have to be loaded onto another vehicle. Similarly, such transports that run on one medium do not run on another, those that do, do so cumbersomely. Those vehicles that are specific to a medium seem better designed to disturb the medium rather than transverse it. Conventional water transport requires deep navigable waterways. Conventional vehicles that will operate from one medium to another are heavily laden with compromises for one medium or the other. Wind powered machines are not tenacious to the medium and are not conducive for use in congested areas. Convention teaches that rolling vehicles need man-made surfaces to roll on.

What is needed is a transport that can swiftly traverse all the mediums (sand, snow, water, ice and air, including paved surfaces), and pull or push heavy loads on a fluid surface.

SUMMARY OF THE INVENTION

The wheel of the present invention satisfies this need. The wheel includes a box portion and a cylindrical portion. The box portion is volumetric and of a generally large surface contact area. The cylindrical or disc portion may be volumetric or not respectively. The radius of the cylindrical portion may be greater or equal to the greatest radius of the square portion (that radius from the center of the back (vertical face) of the box portion to its corner). The boxes create suction forces trying to submerge themselves. The boxes struggle to try to get up and on top of the water like a mammoth in a tar pit or like a moth stuck on the water. Because they are turning in a direction and because there are other factors resisting their submersion they must rise and roll or "run". This is analogous to the "side force" that pushes a sailboat forward in a cross wind. Box wheels roll with the "down force". The motion of a box wheel may be likened to a primate running across the terrain or like the "Jesus Christ" lizard running on top of and through the water. The lizard though must get a running start on solid ground before reaching the water. The box wheel machine though does not require this "runway". The box wheel can rise from submersion at rest, and climb out of and onto the water surface.

A method for using the wheel is to install it on conventional transports that have been fitted with planer buoyant underbellies. An unbuoyant underbelly or tail section is also highly functional as it can be torqued against the water. Such underbelly can effectively hydroplane and even "ground-effect" over the water. At this stage, this transport is flying. A flat planer underbelly or hull is desirable for high-speed travel with heavy loads. The wheels push and pull and need something to pull or push against. This may be an unbuoyant underbelly or the transport may have a generally flat bottom and be relatively buoyant as is a hull. The transport may also have a tail section (hydro elevator) in combination with or without the hull. When in the water, the boxes can pull on the water in a generally hydraulic manner, pulling down on the hull. The center of buoyancy may be forward of the center of suction so as to cause the nose to ascend and the tail to descend below water level. The incline plane of water so created allows the wheels to climb out of the water and onto its surface. The surface of the water may be relatively work-hardened. The machine can climb out of this trough onto the surface and accelerate into ground effect attitude. When operating on a deformable surface such as snow, the wheel will create an inverted catenary pro file on the surface. The boxes are able to roll on deformable surfaces as round wheels can roll on flat surfaces. Generally, most polyhedrons can roll on deformable or specifically or intentionally deformed hard surfaces. Generally, round wheels, conversely, roll smoothly on man-made non-deformable flat surfaces. They don't roll well on natural flats (ice, snow, sand, water). Generally speaking, round is to hard as square is to soft, and the more firm the medium, the more faceted should be the polyhedron. As the medium approaches solid, the polyhedron wheel should approach round. The box wheel of the present invention is tenacious to the water and is therefore easily steered and very capable of pulling or pushing heavy loads in the water. To operate a box wheel vehicle on a lake is very much like driving a car in a large parking lot. The steering of such transports is reliable and accurate.

The resulting use of such a wheel could expedite transport and reduce costs. Maritime weather concerns may be less limiting and transport routes more direct. Port entry at developed ports not necessary. Navigable waterways built shallow and non-navigable waterways become navigable. Emergency vehicles are not disabled from weather or other inclement conditions.

BRIEF DESCRIPTION OF THE DRAWINGS

FIG. 13: Diagram of disc momentum

FIG. 14: Box wheel with disc in between two boxes

FIG. 15: Front side perspective view

FIG. 16: Rear side perspective view

FIG. 17: Right side orthogonal view

FIG. 18: Left side orthogonal view

FIG. 19: Top side perspective view

FIG. 20: Bottom side perspective view

DETAILED DESCRIPTION OF THE INVENTION

Figure 1:
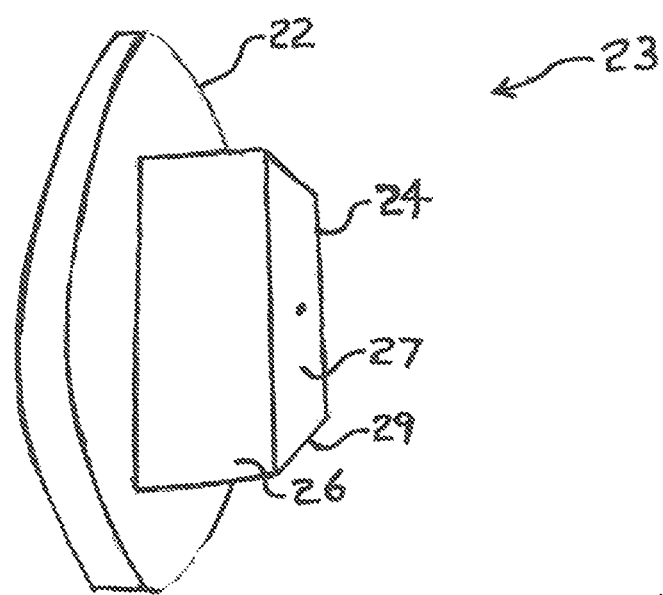
FIG. 1: Perspective view of simple box wheel with large disc
Figure 2:
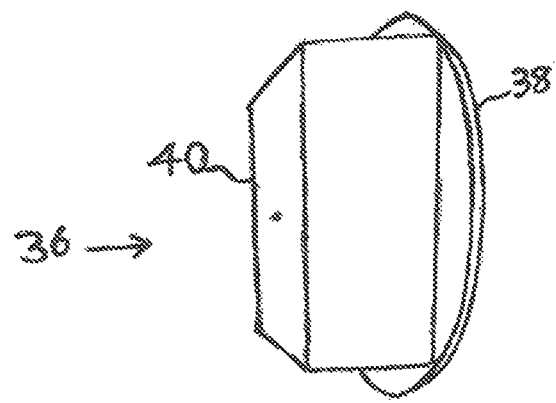
FIG. 2: Perspective view of elementary box wheel with small diameter disc
Figure 3:
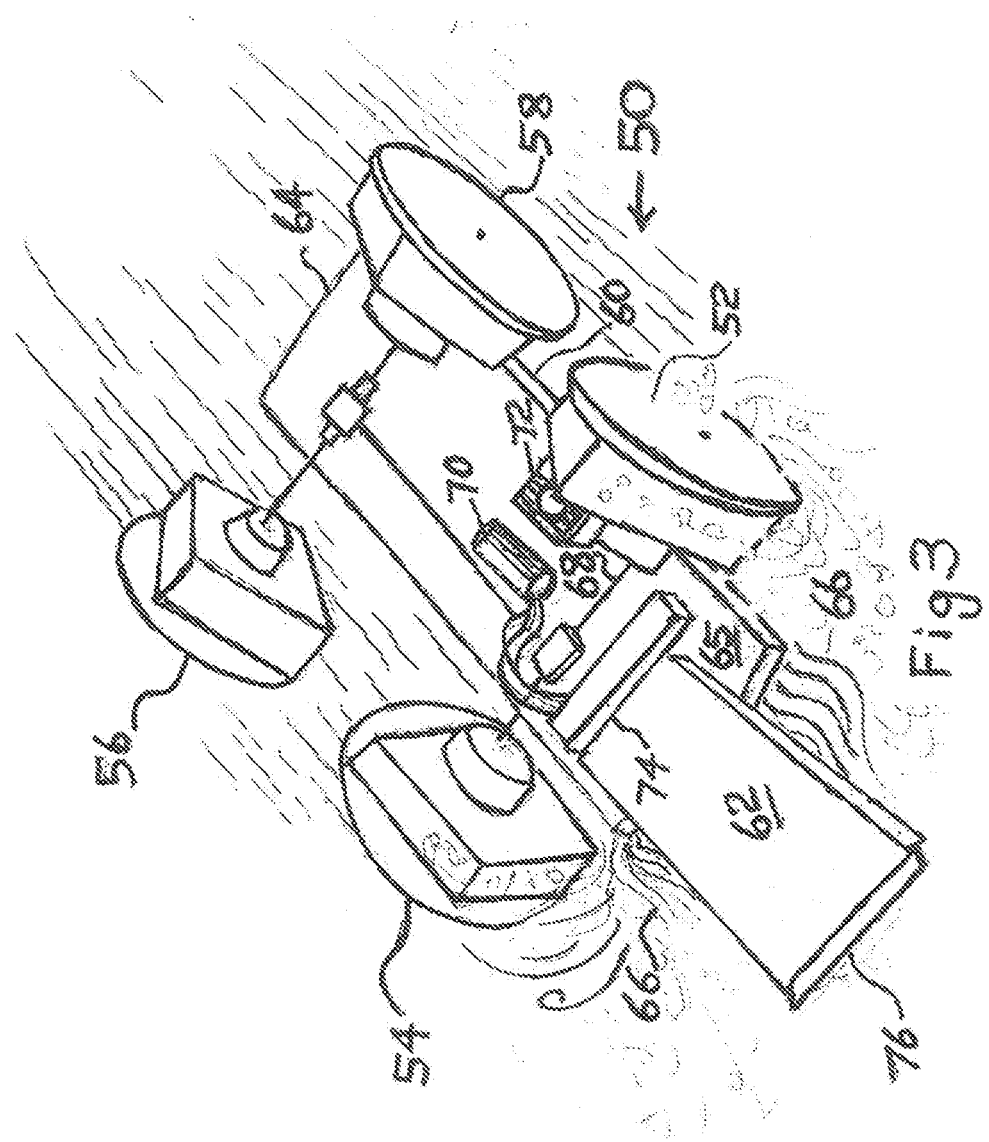
FIG. 3: One-tenth scale four-wheel drive RC vehicle in the water in take-off configuration
Figure 4:
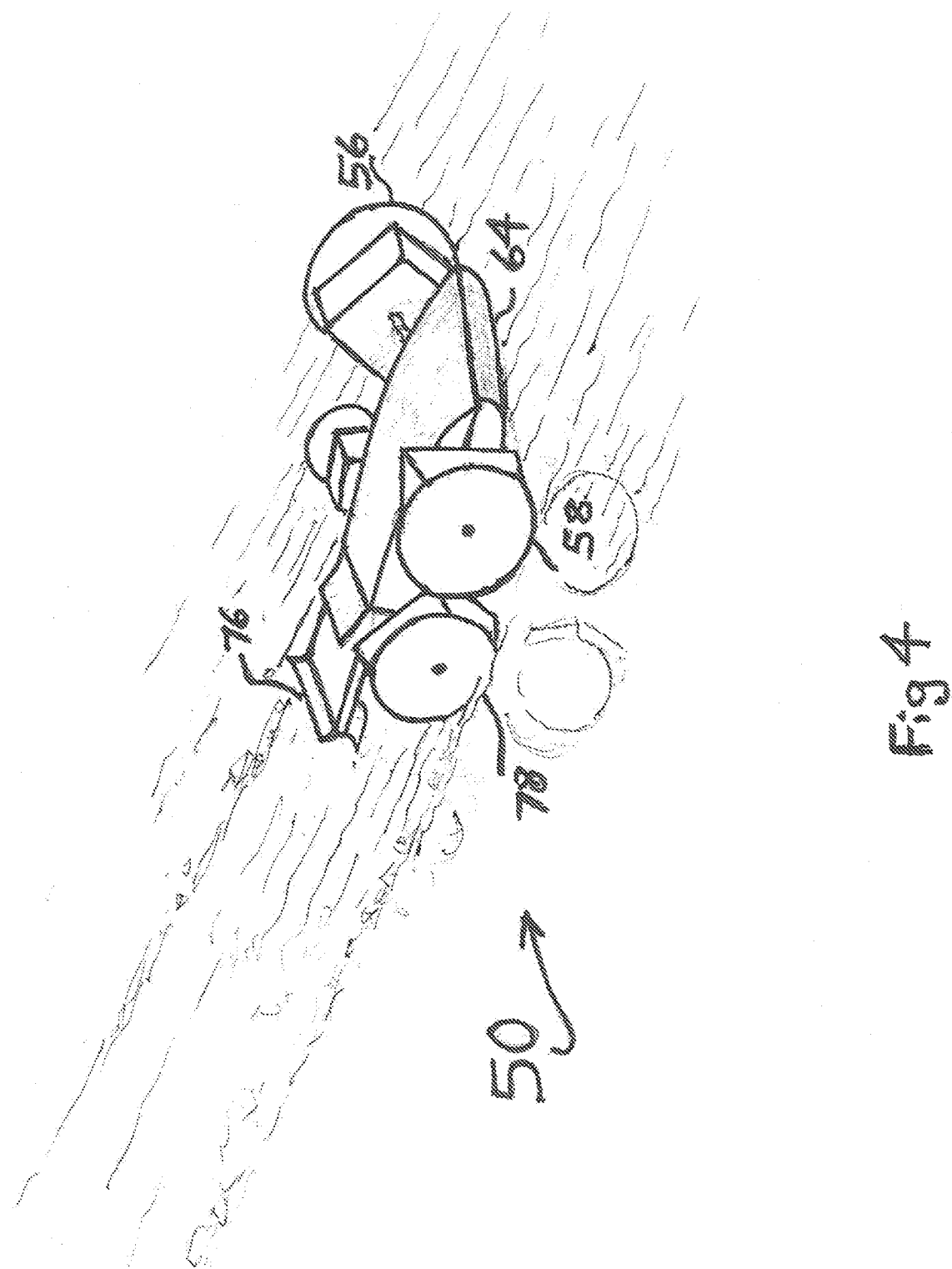
FIG. 4: One-tenth scale four-wheel drive RC vehicle on the lake in cruise configuration
Figure 5:
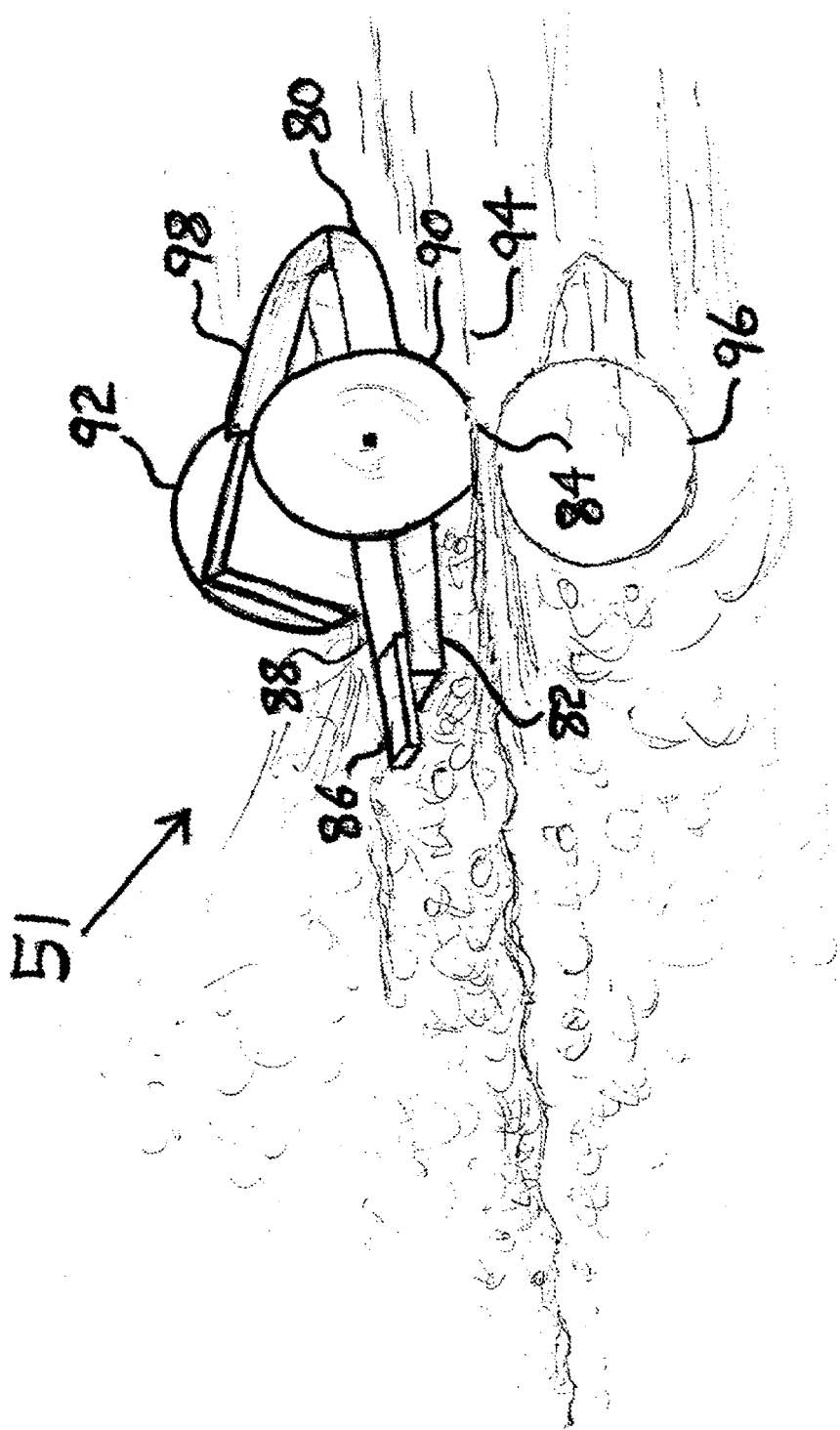
FIG. 5: One-tenth scale RC self-stabilizing two-wheeled vehicle on the lake in cruise configuration
Figure 6:
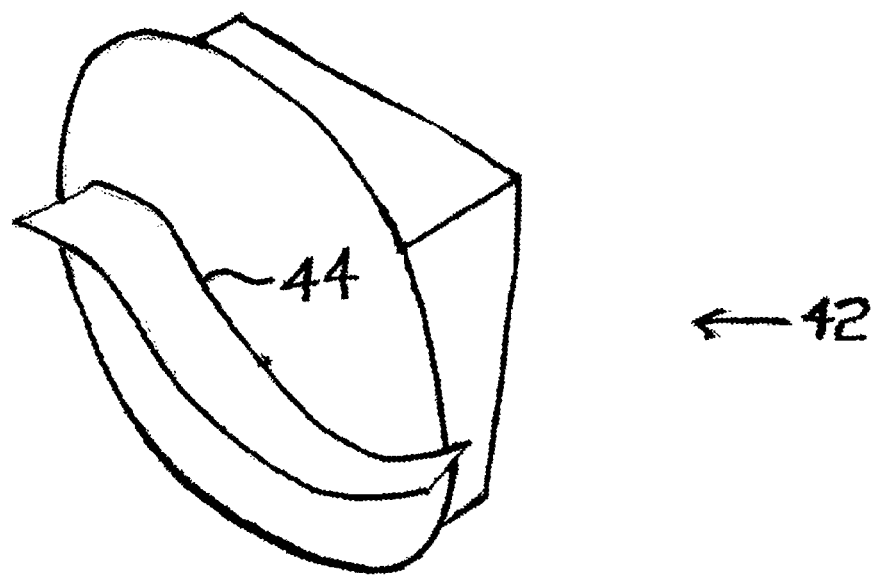
FIG. 6: Two-footed yin-yang style box wheel
Figure 7:
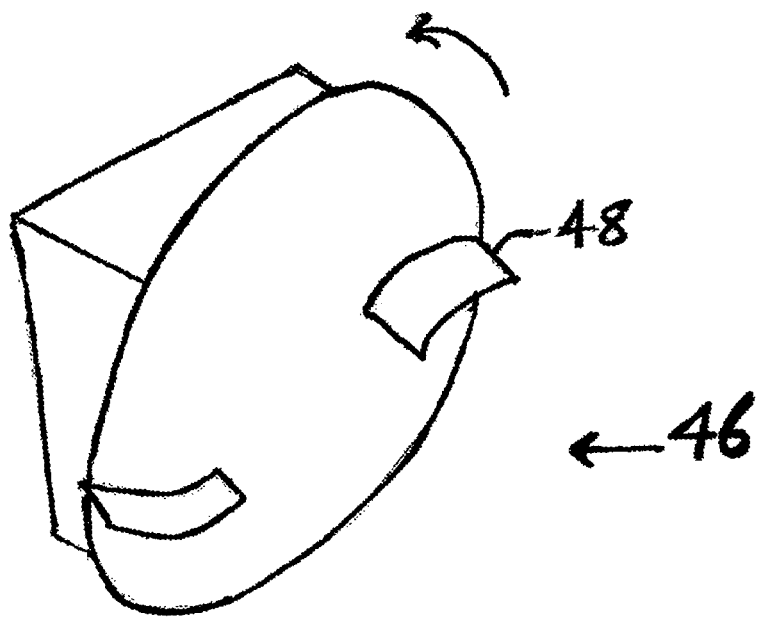
FIG. 7: Two footed box wheel
Figure 8:
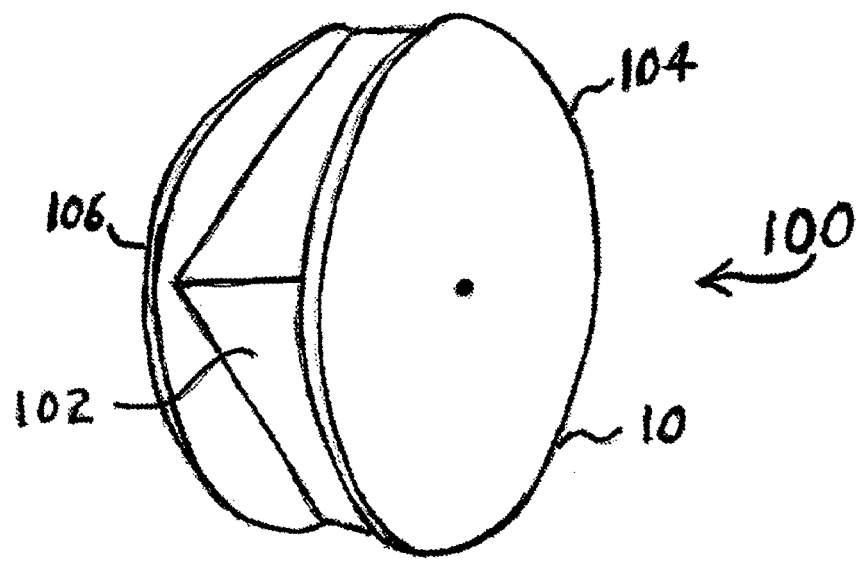
FIG. 8: Yo-Yo styled box wheel
Figure 9:
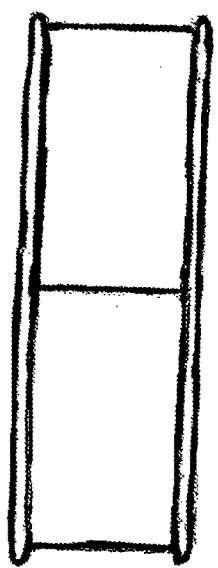
FIG. 9: Orthogonal view of front, rear, top, and bottom sides of Yo-Yo styled box wheel
Figure 10:
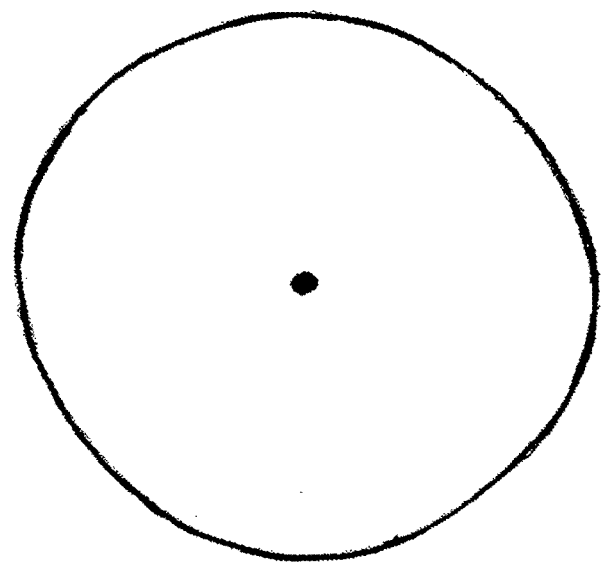
FIG. 10: Orthogonal view of left or right side of Yo-Yo styled box wheel
Figure 11:
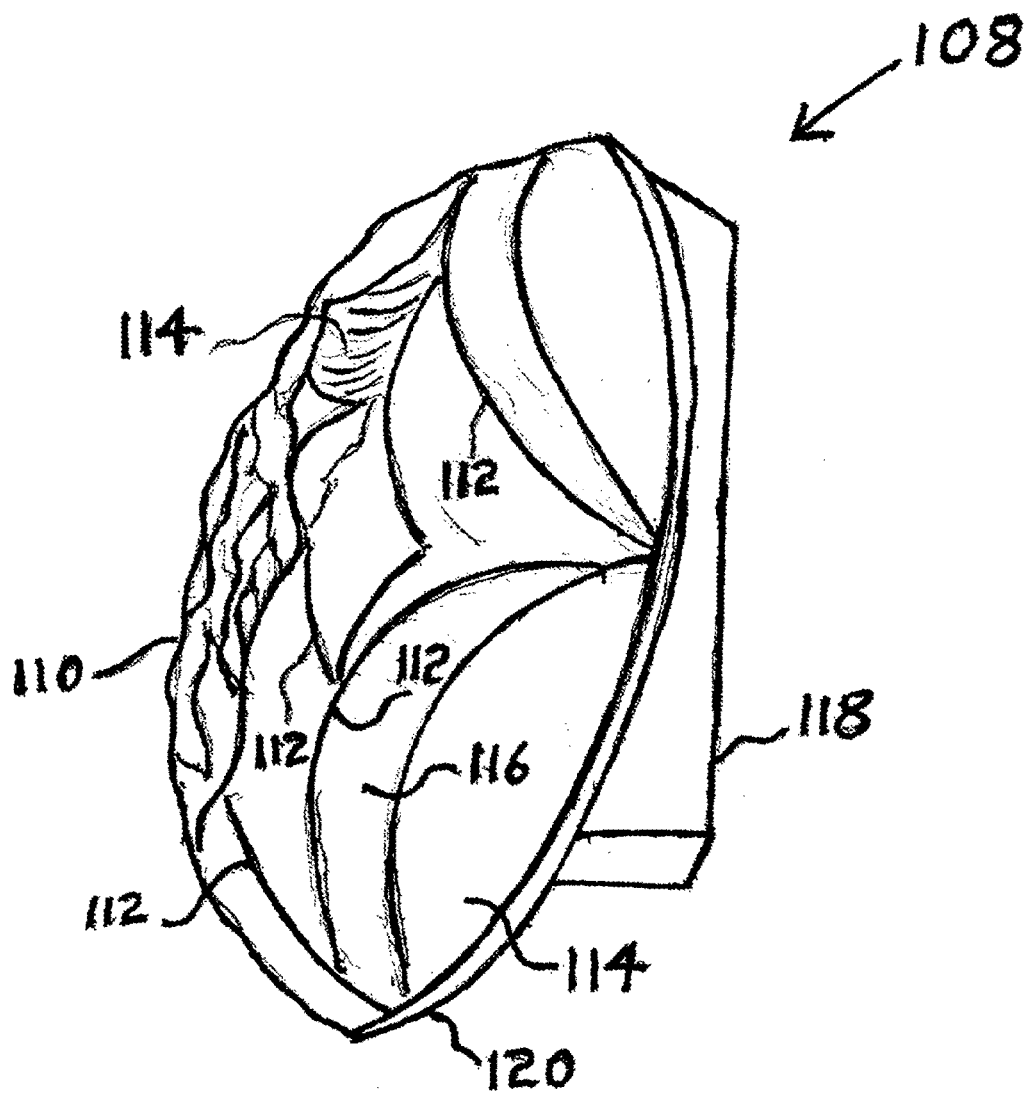
FIG. 11: Fractal pattern box wheel
Figure 12:
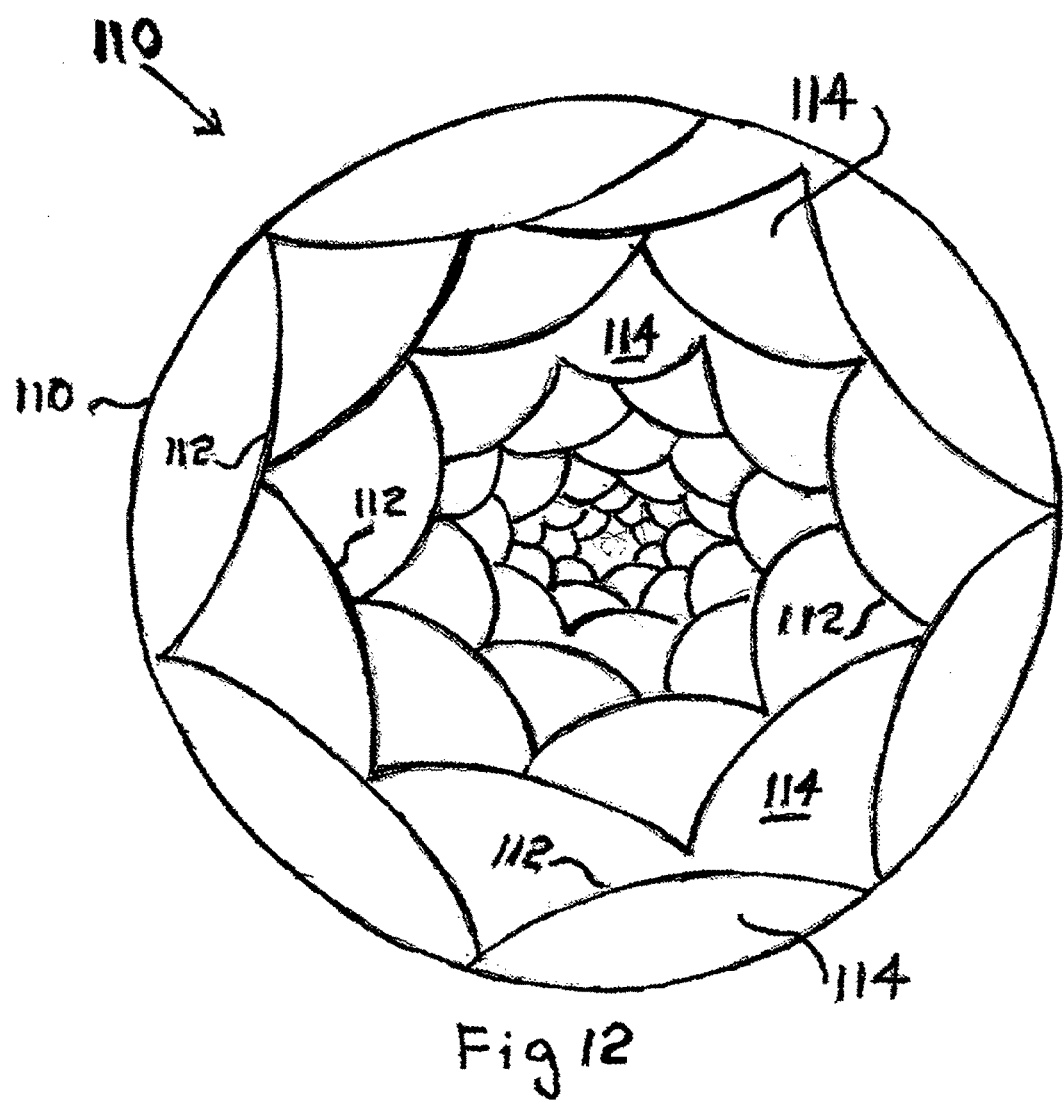
FIG. 12: Orthogonal view of left side (dome side) of FIG. 11
Figure 21:
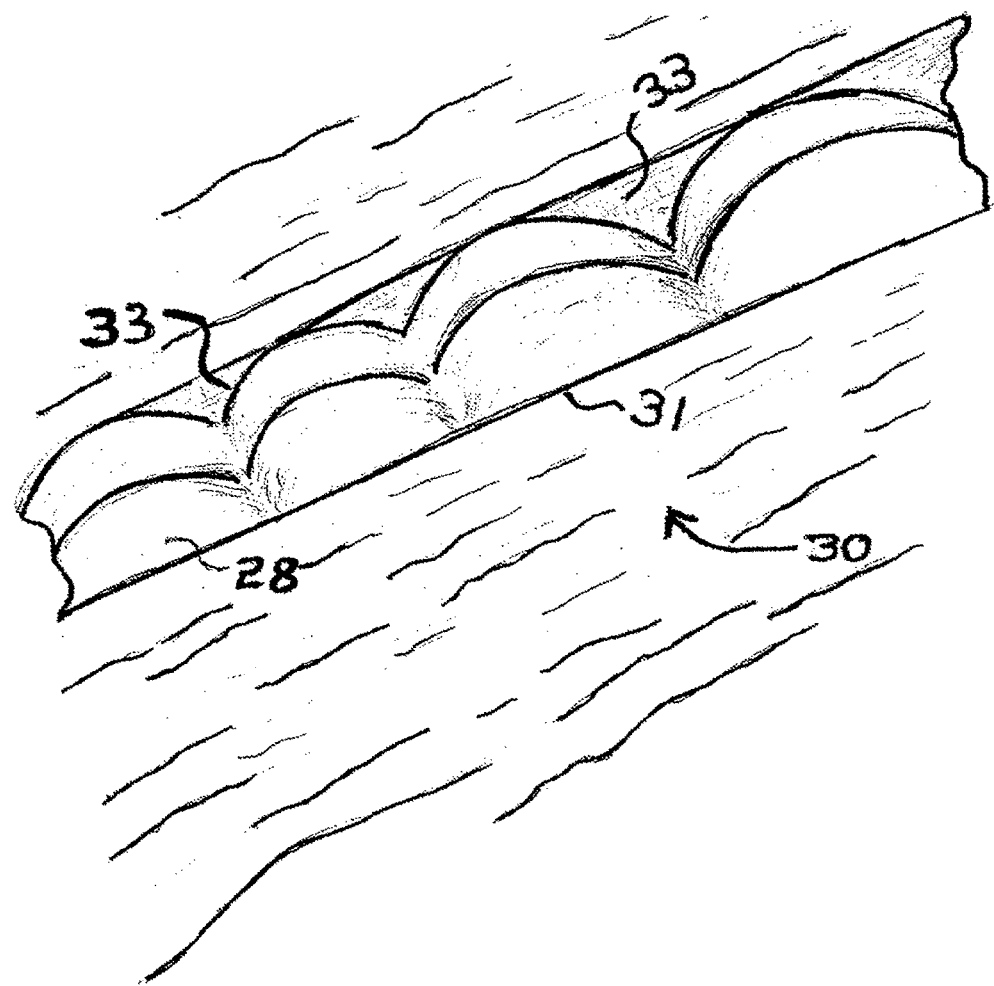
FIG. 21: Perspective view of wheel track in the snow

FIG. 1 is an elementary box wheel 23 with a disc 22 of greater radius than the greatest radius of the box 24 (e.g., from its center in the plane of the disc face to a corner). The box portion 24 may be some other right regular prism other than the square one described. As box wheel 23 rolls on a deformable surface like snow, facet 26 will form a contour 28 in the snow similar to that shown in FIG. 21. The snow must be deep enough that the disc does not touch substrate below the snow for the complete form to occur. One revolution of box wheel 23 will make four consecutive contours. The track 30 so formed in FIG. 21 may be created by a box wheel transport. If the front and rear wheels are properly spaced from one another, the rear wheels will roll almost effortlessly on the track created by the front wheels. Any point on the radius of the disc that is further from its center than the corresponding radius of the box from its center will take a path 32 through the deformable medium (e.g. snow, water, or air) that is generally elliptical or teardrop shaped as shown in FIG. 13. This elliptical path occurs principally as the disc traverses the medium. The momentum of a classic wheel on a solid substrate has a momentum path approximating the profile of road 34 FIG. 13 for any point on its circumference. The momentum path for any point on the circumference of disc 22 is generally prescribed or influenced by the road 34 that box 24 must travel. A large disc 22 relative to the box 24 makes the disc 22 very interactive with the medium (e.g., snow, water, etc.). It may, in some cases, be desirable to minimize disc size as shown in FIG. 2. Box wheel 36 has a minimal radius of its disc 38 that matches the greatest radius in the plane of the base of box 40. A box wheel such as box wheel 36 may minimize drag of the disc. In a relative sense, a box wheel may have a greater circumference than its measured circumference. Finned box wheel 42 FIG. 6 exploits this complex motion with fin 44. Box wheel 46 FIG. 7 exploits this complex motion of the disc with the addition of foot 48. Foot 48 may behave more like a foot when the footed box wheel 46 is turned counter-clockwise and more like a claw if turned clockwise. Fins 44 and foot 48 have aerodynamic effects in the non-teardrop portion of disc momentum path 32. Disc 110 FIG. 11 would also have aerodynamic effects in the non-teardrop portion of the momentum path 32. Rolling a box wheel on water is simple at low RPM. Increase the RPM, and very aggressive suction forces develop. Box wheels work well to create strong suction forces and hence, extreme traction. In FIG. 3 four-wheel drive box wheel vehicle 50 is in take-off configuration. Rear wheels 52 and 54 engage the water more than wheels 56 and 58. All wheels of vehicle 50 are mounted so that ground clearance of the vehicle 50 is the same from front to back when on the pavement. When the vehicle sits in the water, it sits lower in the rear. That is why the rear wheels 52 and 54 are more interactive with the water. When square facet 27 of box 24 FIG. 1 is at rest and oriented so that top and bottom facets are in the plane of the horizon, the bottom edge 29, ideally, for easy take-off, should only slightly penetrate the water's surface. The flat bottom hull 60 FIG. 3 should penetrate the water's surface to about the same depth. The torque produced at take-off causes the front wheels 56 and 58 to lift off of the surface in a "wheelie" for nose up attitude. Flat bottomed hull 60 is freed from the water bond on the buoyant hull 60 in this stage of take-off. Fixed elevator 62 and 65 are thrust (torqued) against and into the water when the nose 64 comes up. This may cause a water swell or wave 66 underneath and aft of wheel axle 68. The downward torque of elevator 62 and stern 65 has a compound effect for take-off. It not only propagates wave 66, but also lifts the rear wheels 52 and 54 up toward the crest of propagated wave 66. 900-watt motor 70, 150-amp speed control 72 and 11.1 volt battery 74 contribute to this aft center of gravity. Wheel 52 and wheel 54 are able to generate high rpm at this stage of take-off. The water may be, in a relative sense, work-hardened or so aeriated that the wheels can break loose of the suction. FIG. 4 is in a more advanced stage of take-off where the front wheels 56 and 58 are very slightly touching the lake surface. In this stage of take-off, the flat-bottomed hull 60 is supported both by ram air confronting nose 64 and some torque from the rear end. The wave propagated is minimal and the wheels are starting to roll on the water. Fixed elevator 62 has leveled after the torque has subsided to the minimum for cruise. The nose level attitude may be assisted with trim tab 76. Water line 78 is further evidence of nose elevation. FIG. 5 demonstrates box wheel two-wheeled vehicle 51 at cruise. Vehicle 51 may be modified or simplified to have only one box wheel 100 FIG. 8 or box wheel 123 FIG. 14 installed in the middle of the longitudinal axis of hull 88 FIG. 5. Any of the other box wheel embodiments maybe used singularly with or without a hull. A hull like hull 88 may be used only for take-off with a uniwheel box wheel. Once the uniwheel is at cruise, it may release the take-off hull. The wheel may then be turned against the payload inside the wheel. Similarly, box wheel vehicles may be of one, two, three, four or more wheels. Nose 80 and stern 82 FIG. 5 are well above the water line 84. Elevator 86 FIG. 5 is necessary for take-off. Elevator 86 and flat-bottomed hull 88 are buoyant structures that, when torqued into the water react to lift box wheels 90 and 92 so that they may roll on the surface 94. 96 is a reflection of box-wheel 90 on the lake surface. Shroud 98 may provide some lift. FIG. 8 depicts box wheel 100. The box 102 is square in the plane of the disc 104 and 106. FIG. 11 depicts box wheel 108. Box wheel 108 has general dome-shaped disc 110 that is generally a sort of fractal pattern. The disc is comprised of ridges 112 and valleys or depressions 114. Wall 116 extends up to ridge 112. Valley 114 interfaces wall 116 at its base. Box 118 is square in the plane of disc 110 on it flat side 120. Disc 110 has structure that relates to foot 48 of box wheel 46 FIG. 7. Similarly, box wheel 42 FIG. 6 relates to the multitude of pinwheel structure in disc 110 of box wheel 108 FIG. 11. Fin 44 FIG. 6 relates in part, to a form in a pinwheel. Any point on any radius from the center of disc 110 FIG. 11 of box wheel 108 that extends past the perimeter of box 118 will have a momentum path 32 similar to that shown in FIG. 13. This momentum path is relevant when the disc 110 FIG. 11 is generally led by the action of the box 118 rolling on a deformable medium. FIG. 14 is a box wheel 123 with disc 122 in between box 124 and box 126. The square polyhedron box was chosen as it is believed to maximize torque on the hull, or other buoyant component (e.g. cylindrical portion of wheel). It is also believed that such a polyhedron is most conducive to generating a generally inverted catenary road of compressed air for a very high speed vehicle to roll on. Disc 106 and disc 104 of box wheel 100 FIG. 8 are analogous to snow wall 31 and snow wall 33 of track 30 FIG. 21. Analogous to walking on a conveyer belt in the direction the conveyor is moving, the so-formed inverted catenary road formed on a deformable surface may be pushed forward. This means that the linear distance traveled for a revolution of the wheel may be greater than the linear distance of its circumference.

From the discussion above those skilled in the art can see that the box wheel of the present invention provides an effective way for locomotion through an array of mediums swiftly and elegantly. The box wheel has the ability to transition from one medium to another without the cumbersome entanglements seen in the prior art. Transports and toys of the present invention are simple to manufacture and operate. Logistical concerns for industry could be greatly minimized with such transport capability.

The invention has been described in considerable detail in order to comply with patent laws by providing a full public disclosure of at least one of the embodiments. However, such a detailed description is not intended in any way to limit the broad features or principals of the invention or the scope of monopoly to be granted. The skilled reader, in view of the specification, may envision numerous variations and combinations of the above disclosed embodiment. Accordingly, the reader should understand that these modifications and equivalents thereof, are within the spirit and scope of the invention as defined in the following claim wherein I claim:

The invention claimed is:

1. A wheel capable of locomotion on liquid, solid, and deformable substrates can row and paddle through, roll atop of and fly as it progresses through suction and torquing to aeration and ground effecting respectively, comprising:
   a. at least one prismatic box portion,
   b. a chassis or hull with a coupling means for conveying rotational energy to said wheel or wheels,
   c. at least one cylindrical wheel or disc portion, whereby at least one said box portion and at least one of its vertical bases is affixed concentrically to at least one said cylindrical portion at its base or bases to form a hybrid wheel that can locomote on one substrate or another or from one medium or substrate to another.

* * * * *